(12) United States Patent
Staal et al.

(10) Patent No.: US 8,481,624 B2
(45) Date of Patent: Jul. 9, 2013

(54) METHODS FOR PRODUCING FLAMEPROOFED THERMOPLASTIC MOULDING COMPOUNDS

(75) Inventors: Maarten Pieter Bram Staal, Mannheim (DE); Norbert Güntherberg, Speyer (DE); Piyada Charoensirisomboon, Mannheim (DE); Hartmut Heinen, Ludwigshafen (DE); Norbert Nießner, Friedelsheim (DE); Walter Heckmann, Weinheim (DE)

(73) Assignee: Styrolution GmbH (DE)

( * ) Notice: Subject to any disclaimer, the term of this patent is extended or adjusted under 35 U.S.C. 154(b) by 68 days.

(21) Appl. No.: 12/680,571

(22) PCT Filed: Sep. 23, 2008

(86) PCT No.: PCT/EP2008/062648
§ 371 (c)(1),
(2), (4) Date: Mar. 27, 2010

(87) PCT Pub. No.: WO2009/043758
PCT Pub. Date: Apr. 9, 2009

(65) Prior Publication Data
US 2010/0305253 A1 Dec. 2, 2010

(30) Foreign Application Priority Data
Sep. 28, 2007 (EP) ..................... 07117513

(51) Int. Cl.
*C08K 5/51* (2006.01)
*C08L 27/12* (2006.01)

(52) U.S. Cl.
USPC .......................................... 524/139; 524/545

(58) Field of Classification Search
USPC ........................................................ 524/139
See application file for complete search history.

(56) References Cited

U.S. PATENT DOCUMENTS

| | | | |
|---|---|---|---|
| 3,737,409 A | 6/1973 | Fox | |
| 4,403,075 A | 9/1983 | Byrd et al. | |
| 6,124,394 A * | 9/2000 | Goto et al. | 524/495 |
| 6,420,442 B1 * | 7/2002 | Dietzen et al. | 521/82 |
| 6,979,715 B2 * | 12/2005 | Manfredi et al. | 525/199 |
| 2005/0075442 A1 * | 4/2005 | Titelman et al. | 524/495 |
| 2006/0118989 A1 | 6/2006 | Shinbach et al. | |
| 2007/0190198 A1 | 8/2007 | Ka et al. | |
| 2009/0324867 A1 * | 12/2009 | Wautier et al. | 428/36.91 |

FOREIGN PATENT DOCUMENTS

| | | |
|---|---|---|
| DE | 1495730 A1 | 4/1969 |
| DE | 1300266 B | 7/1969 |
| DE | 2036173 A1 | 1/1972 |
| DE | 2925208 A1 | 1/1981 |
| DE | 3140520 A1 | 4/1983 |
| DE | 19856759 A1 | 6/2000 |
| DE | 19907831 A1 | 8/2000 |
| DE | 10321081 A1 | 12/2004 |
| EP | 0364729 A1 | 4/1990 |
| EP | 0824134 A1 | 2/1998 |
| EP | 1207183 A1 | 5/2002 |
| EP | 1567883 A1 | 8/2005 |
| JP | 08302056 A | 11/1996 |
| KR | 199601006 | 6/1999 |
| KR | WO-00/26274 A1 | 5/2000 |
| WO | WO-95/35335 A1 | 12/1995 |
| WO | WO-97/40079 A1 | 10/1997 |
| WO | WO-9813412 A1 | 4/1998 |
| WO | WO-00/15718 A1 | 3/2000 |
| WO | WO-00/34342 A2 | 6/2000 |
| WO | WO-00/34367 A2 | 6/2000 |
| WO | WO-00/61664 A1 | 10/2000 |
| WO | WO-03/046071 A1 | 6/2003 |

OTHER PUBLICATIONS

International Preliminary Report on Patentability (IPER) issued in International application No. PCT/EP2008/062648 on Aug. 2, 2010.

* cited by examiner

*Primary Examiner* — Hui Chin
(74) *Attorney, Agent, or Firm* — Novak Druce Connolly Bove + Quigg LLP

(57) ABSTRACT

The invention relates to a process for the preparation of thermoplastic molding materials comprising
A) from 39 to 99% by weight of at least one thermoplastic polymer,
B) from 1 to 60% by weight of a flameproofing component comprising
 B1) an expandable graphite, and
C) from 0 to 60% by weight of further additives,
the percentages by weight being based in each case on the total weight of the components A) to C) and together giving 100% by weight,
by mixing melts of the components A), B) and, if present, C) in a screw extruder, the screw extruder comprising at least one metering zone, one plasticating zone, one homogenization zone and one discharge zone in this sequence along the conveying direction,
wherein the metering of the expandable graphite B1) into the screw extruder is effected at a point behind which—viewed in the conveying direction—the extruder screw comprises substantially no shearing elements,
and thermoplastic molding materials which can be prepared by these processes, the use of said thermoplastic molding materials for the production of fibers, films, moldings and foams, and these fibers, films, moldings and foams themselves.

8 Claims, No Drawings

METHODS FOR PRODUCING FLAMEPROOFED THERMOPLASTIC MOULDING COMPOUNDS

CROSS REFERENCE TO RELATED APPLICATIONS

This application is a National Phase filing under 35 U.S.C. §371 of PCT/EP2008/062648 filed Sep. 23, 2008, which claims priority to Patent Application No. 07117513.7, filed in Europe on Sep. 28, 2007. The entire contents of each of the above-applications are incorporated herein by reference.

DESCRIPTION

The invention relates to a process for the preparation of thermoplastic molding materials comprising
A) from 39 to 99% by weight of at least one thermoplastic polymer,
B) from 1 to 60% by weight of a flameproofing component comprising
B1) an expandable graphite, and
C) from 0 to 60% by weight of further additives,
the percentages by weight being based in each case on the total weight of the components A) to C) and together giving 100% by weight,
by mixing melts of the components A), B) and, if present, C) in a screw extruder, the screw extruder comprising at least one metering zone, one plasticating zone, one homogenization zone and one discharge zone in this sequence along the conveying direction.

The present invention also relates to thermoplastic molding materials which can be prepared by these processes, the use of said thermoplastic molding materials for the production of fibers, films, moldings and foams, and these fibers, films, moldings and foams themselves.

Thermoplastic polymer materials treated with expandable graphite, which is also referred to as exfoliated graphite, as a flameproofing agent are known.

For example, according to WO 03/046071 A1, expandable graphite is used in polystyrene (PS) or impact polystyrene (HIPS). In addition, according to this publication, a halogen-containing compound in amounts of from 2 to 11%, calculated as halogen, is required as the further flameproofing component.

For example, for toxicological reasons, it is however desirable as substantially as possible to avoid using these halogen-containing flameproofing agents.

Thermoplastics flameproofed with the absence of halogen and comprising an expandable graphite and a phosphorus compound as flameproofing components are disclosed in WO 00/34367 and WO 00/34342. Molding materials based on styrene polymers flameproofed in this manner are, however, worthy of improvement with regard to their dripping behavior in the event of a fire.

KR1996-0001006 discloses flameproofed polystyrene, the flameproofing components comprising expandable graphite, a phosphorus compound and Teflon. The mean particle size of the expandable graphite is 5 µm. The Teflon added as an antidrip agent is used in amounts of from 1 to 5 percent by weight. Molding materials flameproofed with the absence of halogen and obtained in this manner have good heat resistance and impact strength.

Thermoplastic molding materials likewise flameproofed with expandable graphite, a phosphorus compound and a fluorinated polymer are disclosed in European patent applications EP 07112183.4 (application number) and EP 07116636.7 (application number), the polymer components of the first-mentioned publication being acrylonitrile/-butadiene/styrene copolymers (ABS) and acrylate/styrene/acrylonitrile copolymers (ASA) and those of the second-mentioned publication being PS and HIPS.

It is often difficult in the case of thermoplastic molding materials which have been rendered flame-retardant with expandable graphite firstly to achieve sufficient flame retardancy and secondly nevertheless to maintain good enough mechanical properties.

It was therefore the object of the present invention to provide thermoplastic molding materials which are treated with expandable graphite and have an improved combination of flame-retardant and mechanical properties in comparison with known molding materials.

Accordingly, the processes defined at the outset were found, it being essential to the invention that the metering of the expandable graphite B1) into the screw extruder is effected at a point behind which—viewed in the conveying direction—the extruder screw comprises substantially no shearing elements.

The thermoplastic molding materials prepared by the processes according to the invention and comprising expandable graphite have an improved combination of flame-retardant and mechanical properties in comparison with known molding materials.

The processes according to the invention and the further subjects according to the invention are described below.

The thermoplastic molding materials which can be prepared by the processes according to the invention comprise
A) from 39 to 99% by weight, preferably from 50 to 95% by weight, particularly preferably from 65 to 90% by weight, of component A,
B) from 1 to 60% by weight, preferably from 5 to 40% by weight, particularly preferably from 10 to 35% by weight, of component B and
C) from 0 to 60% by weight, preferably from 0 to 45% by weight, particularly preferably from 0 to 25% by weight, of component C,
the percentages by weight being based in each case on the total weight of the components A) to C) and together giving 100% by weight.

The flameproofing component B) can in principle consist exclusively of component B1), the expandable graphite. In a preferred embodiment of the invention, however, the flameproofing component B) comprises further components, in particular the components B2) and B3) also described below, in addition to the expandable graphite.

In this case, the flameproofing component B) comprises in particular
B1) from 20 to 79.99% by weight, preferably from 30 to 69.9% by weight, particularly preferably from 40 to 59.5% by weight, of the component B1),
B2) from 20 to 79.99% by weight, preferably from 30 to 69.9% by weight, particularly preferably from 40 to 59.5% by weight, of the component B2) and
B3) from 0.01 to 4% by weight, preferably from 0.1 to 3% by weight, particularly preferably from 0.5 to 2% by weight, of the component B3),
the percentages by weight being based in each case on the total weight of the components B1) to B3) and together giving 100% by weight.

Component A):
In principle, all thermoplastic polymers known to the person skilled in the art and described in the literature are suitable as component A) of the thermoplastic molding materials.

For example, polyolefins, such as polyethylene and polypropylene, polyvinyl chloride, styrene polymers, such as polystyrene (high-impact or non-high-impact), impact-modified vinylaromatic copolymers, such as ABS (acrylonitrile/-butadiene/styrene), ASA (acrylonitrile/styrene/acrylate) and MABS (transparent ABS comprising methacrylate units), styrene/butadiene block copolymers ("SBC"), in particular thermoplastic elastomers based on styrene ("S-TPE"), polyamides, polyesters, such as polyethylene terephthalate (PET), polyethylene terephthalate/-glycol (PETG) and polybutylene terephthalate (PBT), polycarbonate (e.g. Makrolon® from Bayer AG), polymethyl methacrylate (PMMA), poly(ether)sulfones and polyphenylene oxide (PPO)

are suitable as component A).

One or more polymers selected from the group consisting of ASA, ABS, polyamides and polyesters can preferably be used as component A).

Preferred impact-modified vinylaromatic copolymers are impact-modified copolymers of vinylaromatic monomers and vinyl cyanides (SAN). ASA polymers and/or ABS polymers as well as (meth)acrylate/acrylonitrile/butadiene/styrene polymers ("MABS", transparent ABS) are preferably used as impact-modified SAN but also blends of SAN, ABS, ASA and MABS with other thermoplastics, such as polycarbonate, polyamide, polyethylene terephthalate, polybutylene terephthalate, PVC and polyolefins. ASA polymers are generally understood as meaning impact-modified SAN polymers in which elastomeric graft copolymers of vinylaromatic compounds, in particular styrene, and vinyl cyanides, in particular acrylonitrile, on polyalkyl acrylate rubbers are present in a copolymer matrix comprising in particular styrene and/or α-methylstyrene and acrylonitrile.

ABS polymers are generally understood as meaning impact-modified SAN polymers in which diene polymers, in particular 1,3-polybutadiene, are present in a copolymer matrix comprising in particular styrene and/or α-methylstyrene and acrylonitrile.

In principle, all SBC known to the person skilled in the art and described in the literature are suitable as component A). S-TPE are preferably used, in particular those having an elongation at break of more than 300%, particularly preferably more than 500%, in particular from more than 500% to 600% (these and all other elongations at break and tensile strengths mentioned in this application are determined in the tensile test according to ISO 527-2:1996 on test specimens of type 1 BA (Appendix A of said standard: "Small test specimens")).

Particularly preferably, a linear or star-shaped styrene/butadiene/block copolymer having external polystyrene blocks S and styrene/butadiene copolymer blocks in between, with a random styrene/butadiene distribution $(S/B)_{random}$ or a styrene gradient $(S/B)_{taper}$ is admixed as SBC or S-TPE (e.g. Styrolux® or in particular Styroflex® from BASF Aktiengesellschaft, K-Resin® from CPC; further components C) are sold under the brands Cariflex®, Kraton®, Tufprene®, Asaflex®).

The total butadiene content of the SBC is preferably in the range from 15 to 50% by weight, particularly preferably in the range from 25 to 40% by weight, and the total styrene content is accordingly preferably in the range from 50 to 85% by weight, particularly preferably in the range from 60 to 75% by weight.

The styrene/butadiene block (S/B) preferably consists of from 30 to 75% by weight of styrene and from 25 to 70% by weight of butadiene. Particularly preferably, a block (S/B) has a butadiene content of from 35 to 70% by weight and a styrene content of from 30 to 65% by weight.

The proportion of polystyrene blocks S is preferably in the range from 5 to 40% by weight, in particular in the range from 25 to 35% by weight, based on the total block copolymer. The proportion of the copolymer blocks S/B is preferably in the range from 60 to 95% by weight, in particular in the range from 65 to 75% by weight. Linear styrene/butadiene block copolymers of the general structure S-(S/B)-S with one or more blocks $(S/B)_{random}$ located between the two S blocks and having a random styrene/butadiene distribution are particularly preferred. Such block copolymers are obtainable by anionic polymerization in a nonpolar solvent with addition of a polar cosolvent or of a potassium salt, as described, for example, in WO 95/35335 or WO 97/40079.

The vinyl content is understood as meaning the relative proportion of 1,2-linkages of the diene units, based on the sum of the 1,2-, 1,4-cis and 1,4-translinkages. The 1,2-vinyl content of the styrene/butadiene copolymer block (SIB) is preferably less than 20%, in particular in the range from 10 to 18%, particularly preferably in the range of 12-16%.

The unsaturated fractions, in particular those which are derived from butadiene, the S-TPE which can be used as component A) and SBC may also be completely or partly hydrogenated. In the case of (partly) hydrogenated SBC, the proportion of 1,2-linkages of the diene unit before the hydrogenation step may also be up to 60%.

For example, semicrystalline polyolefins, such as homo- or copolymers of ethylene, propylene, 1-butene, 1-pentene, 1-hexene, 4-methyl-1-pentene, and ethylene copolymers with vinyl acetate, vinyl alcohol, ethyl acrylate, butyl acrylate or methacrylate are suitable as component A). A high density polyethylene (HDPE), low density polyethylene (LDPE), linear low density polyethylene (LLDPE), polypropylene (PP), ethylene/vinyl acetate copolymer (EVA) or ethylene/acrylate copolymer is preferably used as component A). A particularly preferred component A) is polypropylene.

Polycarbonates suitable as component A) preferably have a molecular weight (weight average $M_w$, determined by means of gel permeation chromatography in tetrahydrofuran against polystyrene standards) in the range from 10 000 to 60 000 g/mol. They are obtainable, for example, according to the process of DE-B-1 300 266 by interfacial polycondensation or according to the process of DE-A-1 495 730 by reaction of diphenyl carbonate with bisphenols. A preferred bisphenol is 2,2-di(4-hydroxyphenyl)propane, in general—as also below—referred to as bisphenol A.

Instead of bisphenol A, it is also possible to use other aromatic dihydroxy compounds, in particular 2,2-di(4-hydroxyphenyl)pentane, 2,6-dihydroxynaphthalene, 4,4'-dihydroxydiphenyl sulfone, 4,4'-dihydroxydiphenyl ether, 4,4'-dihydroxydiphenyl sulfite, 4,4'-dihydroxydiphenylmethane, 1,1-di-(4-hydroxyphenyl)ethane, 4,4-dihydroxybiphenyl or dihydroxydiphenylcycloalkanes, preferably dihydroxydiphenylcyclohexanes or dihydroxylcyclopentanes, in particular 1,1-bis(4-hydroxyphenyl)-3,3,5-trimethylcyclohexane, and mixtures of the abovementioned dihydroxy compounds. Particularly preferred polycarbonates are those based on bisphenol A or bisphenol A together with up to 80 mol % of the abovementioned aromatic dihydroxy compounds. Polycarbonates particularly suitable as component A are those which comprise units which are derived from resorcinol or alkylresorcinol esters, as described, for example, in WO 00/61664, WO 00/15718 or WO 00/26274; such polycarbonates are sold, for example, by General Electric Company under the brand SollX®. It is also possible to use copolycarbonates according to U.S. Pat. No. 3,737,409; of particular interest there are copolycarbonates based on bisphenol A and di(3,5-dimethyl-dihydroxyphenyl) sulfone, which are distinguished by a high heat distortion resistance. Furthermore, it is possible to use a mixture of the different polycarbonates. The average molecular weights (weight average $M_w$, determined by means of gel permeation chromatography in tetrahydrofuran against polystyrene standards) of the polycarbonates are, according to the invention, in the range from 10 000 to 64 000 g/mol. They are preferably in the range from 15 000 to 63 000, in particular in the range from 15 000 to 60 000, g/mol. This means that the polycarbonates have relative solution viscosities in the range from 1.1 to 1.3, measured in 0.5% strength by weight solution in dichloromethane at 25° C., preferably from 1.15 to 1.33. The relative solution viscosities of the polycarbonates used preferably differ by not more than 0.05, in particular not more than 0.04. The polycarbonates can be used both as milled material and in granulated form.

In general, any aromatic or aliphatic thermoplastic polyurethane is suitable as component A); amorphous aliphatic thermoplastic polyurethanes which are transparent are preferably suitable. Aliphatic thermoplastic polyurethanes and the preparation thereof are known to the person skilled in the art, for example from EP-B1 567 883 or DE-A 10321081, and are commercially available, for example under the brands Texin® and Desmopan® from Bayer Aktiengesellschaft.
Component B):

The thermoplastic molding materials which can be prepared by the processes according to the invention comprise, as component B), a flameproofing mixture comprising expandable graphite B1).

In a preferred embodiment of the invention, the thermoplastic molding materials which can be prepared by the processes according to the invention comprise
B1) expandable graphite,
B2) a flameproofing compound comprising phosphorus and
B3) a fluorine-containing polymer.

The molding materials which can be prepared by the processes according to the invention comprise, as component B1), expandable graphite known to the person skilled in the art and described in the literature, so-called exfoliated graphite (heat-expandable graphite). This is derived as a rule from natural or synthetic graphite.

The exfoliated graphite is obtainable, for example, by oxidation of natural and/or synthetic graphite. $H_2O_2$ or nitric acid in sulfuric acid can be used as oxidizing agents.

Furthermore, the exfoliated graphite can be prepared by reduction, for example with sodium naphthalenide in an aprotic organic solvent.

Owing to its layer lattice structure, graphite is capable of forming special forms of intercalation compounds. In these so-called interstitial compounds, foreign atoms or foreign molecules have been included in the spaces between the carbon atoms in stoichiometric ratios in some cases.

The surface of the exfoliated graphite can be coated with a coating material, for example with silane sizes known to the person skilled in the art, for better compatibility with the thermoplastic matrix.

Where the exfoliated graphite was obtained by the above-mentioned oxidation, it may be necessary to add an alkaline compound since otherwise (owing to the acid present), the exfoliated graphite may cause corrosion of the molding materials and/or storage and preparation apparatuses of such molding materials. In particular, alkali metal compounds $Mg(OH)_2$ or aluminum hydroxides may be added in amounts up to 10, preferably up to 5, % by weight (based on 100% by weight of B1). The mixing is advantageously effected before the components are compounded.

The heat expansion of the exfoliated graphite on rapid heating from room temperature to 800° C. (in the direction of the c axis of the crystal) is preferably at least 100 ml/g, preferably at least 110 ml/g (so-called specific volume change).

What is important for the suitability as a flameproofing agent is that the exfoliated graphite does not greatly expand at temperatures below 270° C., preferably below 280° C. This is understood by the person skilled in the art as meaning that the exfoliated graphite undergoes a volume expansion of less than 20% at said temperatures and a period of 10 min.

The coefficient of expansion (as a specific key quantity) means as a rule the difference between the specific volume (ml/g) after heating and the specific volume at 20° C. (room temperature). This is generally measured by the following method: a quartz container is heated to 1000° C. in an electrical melting furnace. 2 g of exfoliated graphite are rapidly introduced into the quartz container and the latter is left for 10 sec in the melting furnace.

The weight of 100 ml of the expanded graphite is measured in order to determine the so-called loosened apparent specific gravity. The inverse value is then the specific volume at this temperature. The specific volume at room temperature is accordingly measured at 20° C. (coefficient of expansion=specific volume after heating−specific volume at 20° C.).

The median particle size $D_{50}$ of the exfoliated graphite (determined from the integral volume distribution as a volume average of the particle sizes, as determined by means of laser light diffraction on a Malvern Mastersizer 2000 on the dry powder; the laser light diffraction gives the integral distribution of the particle diameter of a sample; from this it is possible to determine the percentage of the particles which have a diameter equal to or less than a certain size; the median particle diameter, which is also referred to as $D_{50}$ value of the integral volume distribution, is defined as the particle diameter at which 50% by weight of the particles have a diameter smaller than the diameter which corresponds to the $D_{50}$ value; likewise, 50% by weight of the particles then have a diameter larger than the $D_{50}$ value) is preferably from 10 µm to 1000 µm, preferably from 30 µm to 850 µm, particularly preferably from 200 µm to 700 µm, before the mixing of the melts in the screw extruder. If the median particle sizes are lower, as a rule a sufficient flameproofing effect is not achieved; if they are greater, the mechanical properties of the thermoplastic molding materials are usually adversely affected.

The density of the exfoliated graphite is usually in the range from 0.4 to 2 $g/cm^3$.

The phosphorus-containing compounds of component B2) are organic and inorganic compounds which comprise phosphorus and in which the phosphorus has the valency state from −3 to +5. The valency state is understood as meaning the term "oxidation state" as stated in the Textbook of Inorganic Chemistry by A. F. Hollemann and E. Wiberg, Walter des Gruyter and Co. (1964, 57th to 70th edition), pages 166 to 177. Phosphorus compounds of valency states from −3 to +5 are derived from phosphine (−3), diphosphine (−2), phosphine oxide (−1), elemental phosphorus (+0), hypophosphorous acid (+1), phosphorous acid (+3), hypodiphosphoric acid (+4) and phosphoric acid (+5).

Among a large number of phosphorus-containing compounds suitable as component B2), in particular the inorganic or organic phosphates, phosphites, phosphonates, phosphate esters, red phosphorus and triphenylphosphine oxide, only some examples are mentioned.

Examples of phosphorus compounds of the phosphine class which have the valency state −3 are aromatic phosphines, such as triphenylphosphine, tritolylphosphine, trinonylphosphine, trinaphthylphosphine and trisnonylphenylphosphine, etc. Triphenylphosphine is particularly suitable.

Examples of phosphorus compounds of the diphosphine class which have the valency state −2 are tetraphenyldiphosphine, tetranaphthyldiphosphine, etc. Tetranaphthyldiphosphine is particularly suitable.

Phosphorus compounds of the valency state −1 are derived from phosphine oxide.

Phosphine oxides of the general formula I

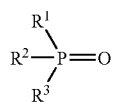

where $R^1$, $R^2$ and $R^3$ in formula I are identical or different alkyl, aryl, alkylaryl or cycloalkyl groups having 8 to 40 carbon atoms, are suitable.

Examples of phosphine oxides are triphenylphosphine oxide, tritolylphosphine oxide, trisnonylphenylphosphine oxide, tricyclohexylphosphine oxide, tris(n-butyl)phosphine oxide, tris(n-hexyl)phosphine oxide, tris(n-octyl)phosphine oxide, tris(cyanoethyl)-phosphine oxide, benzylbis(cyclohexyl)phosphine oxide, benzylbisphenylphosphine oxide, phenylbis(n-hexyl)phosphine oxide. Oxidized reaction products of phosphine with aldehydes, in particular of tert-butylphosphine with glyoxal, are furthermore preferred. Triphenylphosphine oxide, tricyclohexylphosphine oxide, tris(n-octyl) phosphine oxide and tris(cyanoethyl)phosphine oxide are particularly preferably used, in particular triphenylphosphine oxide.

Triphenylphosphine sulfide and its above-described derivatives of phosphine oxides are also suitable.

Phosphorus of valency state ±0 is elemental phosphorus. Red and black phosphorus are suitable. Red phosphorus is preferred.

Phosphorus compounds of "oxidation state"+1 are, for example, hypophosphites of purely organic nature, e.g. organic hypophosphites, such as cellulose hypophosphite esters, esters of hypophosphorous acids with dials, such as, for example, of 1,10-dodecyldiol. Substituted phosphinic acids and the anhydrides thereof, such as, for example, diphenylphosphinic acid, may also be used. Furthermore, diphenylphosphinic acid, di-p-tolylphosphinic acid, dicresylphosphinic anhydride are suitable. However, compounds such as hydroquinone, ethylene glycol, and propylene glycol esters of bis(diphenylphosphinic acid) are also suitable. Aryl(alkyl) phosphinamides, such as, for example, diphenylphosphinic acid dimethylamide, and sulfonamidoaryl(alkyl)phosphinic acid derivatives, such as, for example, p-tolylsulfonamidodiphenylphosphinic acid, are furthermore suitable. Hydroquinone and ethylene glycol esters of bis(diphenylphosphinic acid) and the bisdiphenylphosphinate of hydroquinone are preferably used.

Phosphorus compounds of oxidation state +3 are derived from phosphorous acid. Cyclic phosphonates which are derived from pentaerythritol, neopentylglycol or pyrocatechol, such as, for example, compounds according to formula II

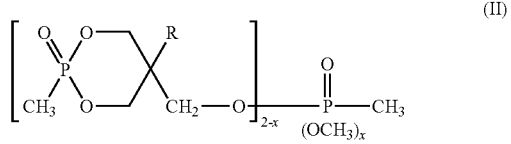

where R is a $C_1$- to $C_4$-alkyl radical, preferably methyl radical, x is 0 or 1 (Amgard® P 45 from Albright & Wilson), are suitable.

Furthermore, phosphorus of valency state +3 is present in triaryl(alkyl) phosphites, such as, for example, triphenyl phosphite, tris(4-decylphenyl) phosphite, tris(2,4-di-tert-butylphenyl) phosphite or phenyl didecyl phosphite, etc. However, diphosphites, such as, for example, propylene glycol 1,2-bis(diphosphite), or cyclic phosphites, which are derived from pentaerythritol, neopentyl glycol or pyrocatechol are also suitable.

Methyl neopentyl glycol phosphonate and phosphite and dimethyl pentaerythrityl diphosphonate and phosphite are particularly preferred.

Hypodiphosphates, such as, for example, tetraphenyl hypodiphosphate or bisneopentyl hypodiphosphate, are especially suitable as phosphorus compounds of oxidation state +4.

Alkyl- and aryl-substituted phosphates are especially suitable as phosphorus compounds of oxidation state +5. Examples are phenyl bisdodecyl phosphate, phenyl ethyl hydrogen phosphate, phenyl bis(3,5,5-trimethylhexyl) phosphate, ethyl diphenyl phosphate, 2-ethylhexyl ditolyl phosphate, diphenyl hydrogen phosphate, bis(2-ethyl-hexyl) p-tolyl phosphate, tritolyl phosphate, bis(2-ethylhexyl) phenyl phosphate, dinonyl phenyl phosphate, phenyl methyl hydrogen phosphate, didodecyl p-tolyl phosphate, p-tolyl bis (2,5,5-trimethylhexyl) phosphate or 2-ethylhexyl diphenyl phosphate. Phosphorus compounds in which each radical is an aryloxy radical are particularly suitable. Triphenyl phosphate and resorcinol bis(diphenylphosphate) and the derivatives thereof which are substituted on the nucleus and are of the general formula III (RDP):

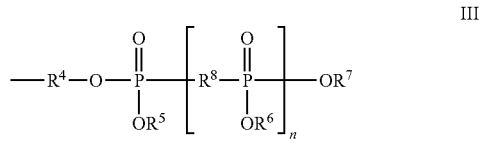

in which the substituents in formula III have the following meaning:

$R^4$-$R^7$ are an aromatic radical having 6 to 20 carbon atoms, preferably a phenyl radical, which may be substituted by alkyl groups having 1 to 4 carbon atoms, preferably methyl, $R^8$ is a divalent phenol radical, preferably

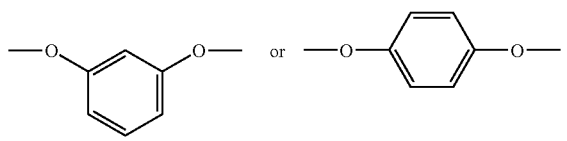

and n has an average value of from 0.1 to 100, preferably from 0.5 to 50, in particular from 0.8 to 10 and very particularly from 1 to 5, are very particularly suitable.

The commercially available RDP products under the trademark Fyroflex® or Fyrol®—RDP (Akzo) and CR 733-S (Daihachi) are, as a result of the production process, mixtures of about 85% of RDP (n=1) with about 2.5% of triphenyl phosphate and about 12.5% of oligomeric fractions in which the degree of oligomerization is generally less than 10.

Furthermore, cyclic phosphates may also be used. Diphenyl pentaerythrityl diphosphate and phenyl neopentyl phosphate are particularly suitable here.

In addition to the abovementioned low molecular weight phosphorus compounds, oligomeric and polymeric phosphorus compounds are also suitable.

Such polymeric, halogen-free organic phosphorus compounds having phosphorus in the polymer chain form, for example, in the preparation of pentacyclic, unsaturated phosphine dihalides, as described, for example, in DE-A 20 36 173. The molecular weight, measured by vapor pressure osmometry in dimethylformamide, of the polyphospholine oxides should be in the range from 500 to 7000, preferably in the range from 700 to 2000.

Here, the phosphorus has the oxidation state −1.

It is furthermore possible to use inorganic coordination polymers of aryl(alkyl) phosphinic acids, such as, for example, poly-β-sodium(I) methylphenylphosphinate. Their preparation is stated in DE-A 31 40 520. The phosphorus has the oxidation number +1.

Furthermore, such halogen-free polymeric phosphorus compounds can form by the reaction of a phosphonyl chloride, such as, for example, phenyl-, methyl-, propyl-, styryl- and vinylphosphonyl dichloride, with bifunctional phenols, such as, for example, hydroquinone, resorcinol, 2,3,5-trimethylhydroquinone, bisphenol A or tetramethyl-bisphenol A.

Further halogen-free polymeric phosphorus compounds which may be present in the molding materials according to the invention are prepared by reaction of phosphoryl chloride or phosphoric acid ester dichlorides with a mixture of mono-, bi- and trifunctional phenols and other compounds carrying hydroxyl groups (cf. Houben-Weyl-Müller, Thieme-Verlag Stuttgart, Organische Phosphorverbindungen, part II (1963)). Furthermore, polymeric phosphonates can be prepared by transesterification reactions of phosphonic acid esters with bifunctional phenols (cf. DE-A 29 25 208) or by reactions of phosphonic acid esters with diamines or diamides or hydrazides (cf. U.S. Pat. No. 4,403,075). However, the inorganic poly(ammonium phosphate) is also suitable.

It is also possible to use oligomeric pentaerythrityl phosphites, phosphates and phosphonates according to EP-B 8 486, e.g. Mobil Antiblaze® 19 (registered mark of Mobil Oil) (cf. formulae IV and V):

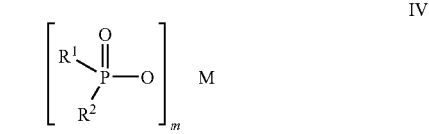

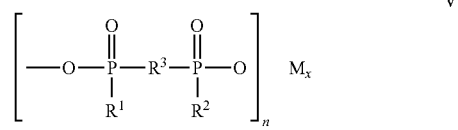

where the substituents in the formulae IV and V have the following meaning:

$R^1$, $R^2$ are hydrogen, $C_1$- to $C_6$-alkyl which, if appropriate, comprises a hydroxyl group, preferably $C_1$- to $C_4$-alkyl, linear or branched, e.g. methyl, ethyl, n-propyl, isopropyl, n-butyl, tert-butyl, n-pentyl; phenyl; preferably at least one radical $R^1$ or $R^2$, in particular $R^1$ and $R^2$, being hydrogen;

$R^3$ is $C_1$- to $C_{10}$-alkylene, linear or branched, e.g. methylene, ethylene, n-propylene, isopropylene, n-butylene, tert-butylene, n-pentylene, n-octylene, n-dodecylene;

arylene, e.g. phenylene, naphthylene;

alkylarylene, e.g. methylphenylene, ethylphenylene, tert-butylphenylene, methylnaphthylene, ethylnaphthylene, tert-butylnaphthylene;

arylalkylene, e.g. phenylmethylene, phenylethylene, phenylpropylene, phenylbutylene;

M is an alkali earth metal, alkali metal, Al, Zn, Fe or boron;

m is an integer from 1 to 3;

n is an integer from 1 to 3 and x is 1 or 2.

Compounds of the formula IV in which $R^1$ and $R^2$ are hydrogen, M preferably being Ca, Zn or Al are particularly preferred and calcium phosphinate is a very particularly preferred compound.

Such products are commercially available, for example as calcium phosphinate.

Suitable salts of the formula IV or V in which only one radical $R^1$ or $R^2$ is hydrogen are, for example salts of phenylphosphinic acid, the Na and/or Ca salts thereof being preferred.

Further preferred salts have an alkyl radical $R^1$ and/or $R^2$ containing a hydroxyl group. These are obtainable, for example, by hydroxymethylation. Preferred compounds are Ca, Zn and Al salts.

The median particle size $D_{50}$ of the component B2) (determined as described in the case of the median particle size $D_{50}$ of the expandable graphite B1)) is preferably less than 10 μm, preferably less than 7 μm and in particular less than 5 μm.

The $D_{10}$ value is preferably less than 4 μm, in particular 3 μm and very particularly preferably less than 2 μm.

Preferred $D_{90}$ values are less than 40 μm and in particular less than 30 μm and very particularly preferably less than 20 μm.

Phosphorus compounds of the general formula VI:

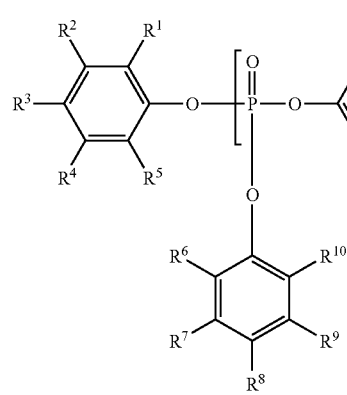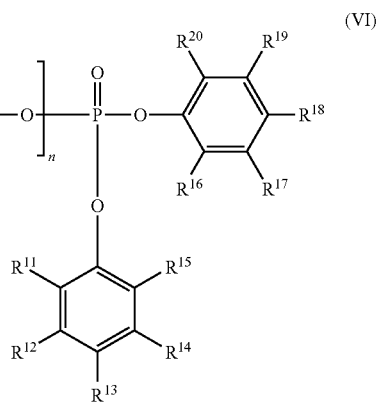

where the substituents in formula VI have the following meaning:
$R^1$ to $R^{20}$, independently of one another, are hydrogen, a linear or branched alkyl group having up to 6 carbon atoms,
n has an average value of from 0.5 to 50 and
X is a single bond, C=O, S, $SO_2$ or $C(CH_3)_2$,
are furthermore preferred.

Preferred compounds B2) are those of the formula VI in which $R^1$ to $R^{20}$, independently of one another, are hydrogen and/or a methyl radical. Where $R^1$ to $R^{20}$, independently of one another, are a methyl radical, preferred compounds are those in which the radicals $R^1$, $R^5$, $R^6$, $R^{10}$, $R^{11}$, $R^{15}$, $R^{16}$, $R^{20}$ in the ortho position relative to the oxygen of the phosphate group are at least one methyl radical. Compounds B2) in which one methyl group, preferably in the ortho position, is present per aromatic ring and the other radicals are hydrogen are furthermore preferred.

$SO_2$ and S are particularly preferred as substituents, and very particularly preferably $C(CH_3)_2$ for X in the above formula (VI).

In the above formula (VI), the average value of n is preferably from 0.5 to 5, in particular from 0.7 to 2 and in particular≈1.

n as an average value arises from the preparation process of the abovementioned compounds, so that the degree of oligomerization is generally less than 10 and a small proportion (generally <5% by weight) of triphenyl phosphate are present, this differing from batch to batch. Such compounds B2) are commercially available as CR-741 from Daihachi.

The molding materials comprise a fluorine-containing polymer as component B3). The fluorine-containing ethylene polymers are preferred. These are polymers of ethylene having a fluorine content of from 55 to 76% by weight, preferably from 70 to 76% by weight.

Examples of these are polytetrafluoroethylene (PTFE), tetrafluoroethylene/hexafluoro-propylene copolymer or tetrafluoroethylene copolymers with smaller proportions (as a rule up to 50% by weight) of copolymerizable ethylenically unsaturated monomers. These are described, for example, by Schildknecht in "Vinyl and Related Polymers", Wiley Publishers, 1952, pages 484 to 494, and by Wall in "Fluoropolymers" (Wiley Interscience, 1972).

These fluorine-containing ethylene polymers are present homogeneously distributed in the molding materials and preferably have a median particle size $D_{50}$ in the range from 0.05 to 10 µm, in particular from 0.1 to 5 µm. These small particle sizes can be particularly preferably achieved by using aqueous dispersions of fluorine-containing ethylene polymers and incorporating them into a polymer melt.

Component C):

The thermoplastic molding materials which can be prepared by the processes according to the invention may comprise one or more additives—differing from the components A) and B)—as component C). In principle, all additives customary for plastic which are known to the person skilled in the art and described in the literature are suitable. In the context of the present invention, additives customary for plastic are, for example, stabilizers and antioxidants, heat stabilizers and agents to prevent decomposition by ultraviolet light, lubricants and demolding agents, dyes and pigments and plasticizers and fibers, for example glass fibers or carbon fibers.

Antioxidants and heat stabilizers which may be added to the thermoplastic molding material according to the invention are, for example, halides of metals of group I of the Periodic Table of the Elements, e.g. sodium, potassium and lithium halides. Zinc fluoride and zinc chloride may furthermore be used. Sterically hindered phenols, hydroquinones, substituted members of this group, secondary aromatic amines, if appropriate in combination with phosphorus-containing acids or salts thereof, and mixtures of these compounds, preferably in concentrations of up to 1% by weight, based on the weight of the thermoplastic molding materials, can furthermore be used.

Examples of UV stabilizers are different substituted resorcinols, salicylates, benzotriazoles and benzophenones, which are generally used in amounts of up to 2% by weight, based on the weight of the thermoplastic molding materials.

Lubricants and demolding agents, which as a rule may be added in amounts of up to 1% by weight, based on the weight of the thermoplastic molding materials, are stearic acid, stearyl alcohol, alkyl stearates and stearamides and esters of pentaerythritol with long-chain fatty acids. It is also possible to use calcium, zinc or aluminum salts of stearic acid and dialkyl ketones, e.g. distearyl ketone. Zinc, magnesium and calcium stearate and N,N'-ethylenebisstearamide are particularly suitable according to the invention.

All glass fibers known to the person skilled in the art and described in the literature may be used as glass fibers in the molding materials according to the invention (cf. for example Milewski, J. V., Katz, H. S. "Handbook of Reinforcements for Plastics", page 233 et seq., Van Nostrand Reinholt Company Inc, 1987).

Preparation Process:

The thermoplastic molding materials are prepared by mixing melts of the components A), B) and, if present, C) in a screw extruder, the screw extruder comprising at least one metering zone, one plasticating zone, one homogenization zone and one discharge zone in this sequence along the conveying direction.

Suitable screw extruders are described, for example, in Saechtling, Kunststoff-Taschenbuch, Hanser Publishers, Munich, Vienna, edition 26, 1995, pages 191 to 246. Screw extruders usually have sections of different function, so-called zones. The different zones of the screw extruders are not necessarily identical to the individual components, such as barrel parts or screw segments from which the screw extruders are assembled. As a rule, a zone consists of a plurality of components. Depending on the function, the individual zones may have different spatial dimensions, for example different lengths or volumes. Usually, screw extruders have one or more of the zones described below. In addition, however, screw extruders may also have zones whose function is not explicitly described below.

Metering zone is to be understood as meaning that section of a screw extruder in which one or more components, for example a thermoplastically processable polymer, are fed to the screw extruder. This feed can be effected by means of a metering apparatus which, for example, consists of an opening at the top of the screw extruder with attached hopper, so that the component to be metered enters the screw extruder under the force of gravity. However, the metering apparatus can, for example, also consist of a conveying screw or an extruder by means of which the component to be metered is forced through the metering opening of the screw extruder.

The plasticating zone (often also referred to as melting zone) is to be understood as meaning that section of a screw extruder in which a component, in particular component A), is brought into a thermoformable, generally molten or plastically deformable, state. As a rule, this is achieved by heating or mechanically introduced energy. The components familiar to the person skilled in the art are suitable as plasticating elements for introducing mechanical energy, for example screw elements having a small pitch in the conveying direction, kneading blocks having narrow or broad, conveying or nonconveying kneading disks, screw elements having a pitch opposite to the conveying direction, or a combination of such elements. With regard to their type, number and dimensioning, the choice of the plasticating elements in the plasticating zone depends on the components of the thermoplastic molding materials, in particular on the viscosity and softening temperature and the miscibility of the components.

Homogenization zone is to be understood as meaning that section of a screw extruder in which one or more components, of which at least one is in the thermoformable state, are homogenized. This homogenization is generally effected by mixing, kneading or shearing. Suitable mixing, kneading and shearing elements are, for example, the means already described as plasticating elements. In addition, suitable homogenization elements are combinations of conveying, nonconveying and back-conveying kneading blocks which may consist of narrow or broad kneading disks or combinations thereof. Homogenization elements which are also suitable are so-called toothed disks which may also be equipped with conveying or nonconveying teeth, or so-called toothed mixing elements in which, for example, the thread is not continuous but consists of a number of teeth; these toothed mixing elements, too, may be conveying or nonconveying. Further homogenization elements known to the person skilled in the art are so-called SMEs, screws having interrupted threads, blister disks and various types of special elements which are commercially available from different extruder manufacturers.

The discharge zone is to be understood as meaning that section of a screw extruder in which the discharge of the thermoplastically processable molding material from the screw extruder is prepared and is carried out through the outlet opening. The discharge zone generally consists of a conveying screw and a closed barrel part which is terminated by a defined outlet opening.

A die head which, for example, is in the form of a die plate or die strip is preferably used as the outlet opening, it being possible for the dies to be circular (hole die plate), slot-like or of another design. The product discharged as an extrudate in the case of a die plate is as usual cooled, for example in water, and granulated. Especially with the use of a slot die, cube granulation is possible.

If the thermoplastically processable molding materials are not first obtained as granules but are to be directly further used, further processing in the hot state or direct extrusion of sheets, films, tubes and profiles is also advantageous.

A screw extruder can moreover comprise further zones, for example venting or devolatilization zones for removing gaseous constituents or squeeze zones and dewatering zones for separating off and discharging a liquid constituent, which may be water but also other substances. Devolatilization, squeeze and dewatering zones and their design and arrangement in terms of apparatus are described in WO 98/13412, and reference is therefore expressly made to said publication with regard to these features.

A section of a screw extruder may also combine two or more of said zones. If, for example, a further substance is metered into the homogenization zone of an extruder, the homogenization zone simultaneously acts as a metering zone. In an analogous manner, the other zones among said zones can simultaneously be realized in one section of the screw extruder.

The individual zones may be clearly spatially delimited from one another or may run continuously into one another. Thus, for example in an extruder, the transition from the plasticating zone to the homogenization zone cannot always be clearly delimited spatially. There is often a continuous transition between the two zones.

As is generally known, the various zones of a screw extruder can be individually heated or cooled in order to establish an optimum temperature profile along the conveying direction. Suitable heating and cooling apparatuses are known to the person skilled in the art.

The temperatures and spatial dimensions of the individual zones which are to be chosen in the individual case differ depending on the chemical and physical properties of the components and their ratios. Thus, for example, the mixing temperatures in the homogenization zone are as a rule from 100° C. to 400° C. or, with the use of ABS or ASA as component A), as a rule from 200 to 280° C.

As already described above, the melt mixing processes according to the invention employ a screw extruder which comprises at least one metering zone, one plasticating zone, one homogenization zone and one discharge zone in the sequence along the conveying direction.

In an embodiment of the invention, all components of the thermoplastic molding materials—except for the substantial amount of component B1)—can be fed simultaneously to the metering zone of the screw extruder, either spatially separately from one another or together. It is also possible for the individual components of the thermoplastic molding materials—except for the substantial amount of component B1)—to be premixed and to be fed to the metering zone and the remaining components then to be added individually and/or likewise as a mixture behind this metering zone, viewed in the conveying direction.

What is essential to the invention is that the metering of the main amount, preferably of the total amount, of the expandable graphite B1) into the screw extruder is effected at a point behind which—viewed in the conveying direction—the extruder screw comprises substantially no shearing elements. Preferably, the extruder screw behind the metering point comprises only screw elements which have a substantially conveying action on the extruded material.

In principle, the metering of the expandable graphite B1) into the screw extruder can therefore also be effected in the metering zone or the plasticating zone itself if the screw extruder has substantially no shearing elements in the conveying direction, viewed from this feed point of component B1). However, in this embodiment of the processes according to the invention, it is difficult to obtain homogeneous molding materials.

Advantageously, the metering of the expandable graphite B1) into the screw extruder is therefore effected in the homogenization zone (i.e. the extruder screw can be equipped with shearing elements in the plasticating zone), particularly preferably between homogenization zone and discharge zone (i.e. the extruder screw can be equipped with shearing elements in the plasticating zone and/or the homogenization zone).

The expandable graphite B1) can be added in pure form but also as a mixture with another component, for example with a part of component A) as a so-called additive batch.

The feature that "the extruder screw comprises substantially no shearing elements" means that the extruder screw has only elements, for example mixing or conveying elements, which display as small a shearing effect as possible; shearing elements whose substantial function is to introduce shear forces into the conveyed material are not present.

An alternative definition of the process according to the invention (in which the characterization of shearing elements and their function, which is difficult to reproduce in words, is avoided) is that the preparation of the thermoplastic molding materials comprising the components A), B) and, if appropriate, C) in the amounts described above is likewise effected by mixing melts of the components in a screw extruder, the screw extruder, as described above, comprising at least one metering zone, one plasticating zone, one homogenization zone and one discharge zone in this sequence along the conveying direction, the feature essential to the invention being that the screw configuration is chosen so that, after the discharge from the screw extruder, the ratio of the area-weighted (area average) and arithmetic median value (number average) of the particle size distribution (maximum dimension of the particles) $D_a/D_n$ of the expandable graphite B1) in the thermoplastic molding materials is in the range from 3.7 to 6, preferably in the range from 3.85 to 5, particularly preferably in the range from 4 to 4.5, and the median particle size $D_a$ (area average) of the expandable graphite B1) in the thermoplastic molding materials is in the range from 50 µm to 1000 µm, preferably in the range from 70 µm to 500 µm, particularly preferably in the range from 100 to 300 µm, the number n and maximum dimension D of all particles of the expandable graphite (component B1) in the thermoplastic molding materials after mixing of the melts in the screw extruder being determined on the basis of investigations, under an optical microscope, of thin sections taken from an extruded film or sheet with the light transmission direction perpendicular to the extrusion direction and narrow side of the film or sheet by image evaluation. The detailed evaluation method is described under the examples. From the number n and maximum dimension D of all particles, determined in this manner, the median particle size $D_a$ (area average) and $D_n$ (number average) were determined using the following formulae:

$$D_n = \frac{\Sigma_i n_i \cdot D_i}{\Sigma_i n_i}$$

$$D_a = \frac{\Sigma_i n_i \cdot (D_i)^2}{\Sigma_i n_i \cdot D_i}$$

Screw extruders used may be single-screw extruders or twin-screw extruders which may rotate in the same direction and intermesh as well as those which intermesh in opposite directions and are non-intermeshing. Twin-screw extruders are preferably used. Corotating, intermeshing twin-screw extruders are particularly preferred.

It is possible to use extruders having screws with a small, medium or large thread depth (so-called "deep-flighted screw"). The thread depth of the screws to be used is dependent on the machine type. The machine type to be used in each case depends on the respective task.

The number of turns of flight of the screws of the extruder may vary. Double-flight screws are preferably used. However, it is also possible to use screws having other numbers of turns of flight, for example single-flight or three-flight screws, or those screws which have sections with different numbers of turns of flight.

The numbers of turns of flight of the extruder screw may vary within a wide range. Relatively high rotational speeds are preferably used. Suitable rotational speeds are in the range from 50 to 1200 rpm, preferably from 100 to 1000 rpm, particularly preferably from 200 to 900 rpm.

The thermoplastic molding materials prepared by the processes according to the invention and comprising expandable graphite have an improved combination of flame-retardant and mechanical properties in comparison with known molding materials.

The molding materials prepared according to the invention are suitable for the production of fibers, films, moldings and foams of any type. Fibers, films, moldings and foams comprising the molding materials prepared according to the invention can be used, for example, as household articles, electronic components, medical apparatuses, automotive components and building materials.

The invention is explained in more detail below with reference to examples.

EXAMPLES

Methods of Measurement

Median particle sizes $D_a$ [µm], $D_n$ [µm] and the ratio $D_a/D_n$ thereof [dimensionless] of the expandable graphite (component B1) in the thermoplastic molding materials after mixing of the melts in the screw extruder: The number n and maximum dimension D of all particles of the expandable graphite (component B1) in the thermoplastic molding materials after mixing of the melts in the screw extruder were determined by means of investigations under an optical microscope (transmitted light bright field) under 4 times primary magnification (final magnification 74:1) of thin-section micrographs of any two regions on extruded film or sheet measuring in each case at least 1.7 mm×1.3 mm (the thin sections were taken using a Leica Microtome RM 2165 with a diamond knife) with a light transmission direction perpendicular to the extrusion direction and narrow side of the film or sheet by image evaluation.

Particles associated in the image were separated by manual correction. The image evaluation was effected on the basis of digitized images using the analySIS software from Soft Imaging System GmbH.

The median particle sizes $D_a$ (area average) and $D_n$ (number average) were determined from the number n and maximum dimension D of all particles determined in this manner, using the following formulae:

$$D_n = \frac{\Sigma_i n_i \cdot D_i}{\Sigma_i n_i}$$

$$D_a = \frac{\Sigma_i n_i \cdot (D_i)^2}{\Sigma_i n_i \cdot D_i}$$

Notched impact strength $a_k$ [kJ/m$^2$]:
the notched impact strength $a_k$ was determined according to ISO 179 1eA(F) at 23° C.

Afterburning times t1 and t2 [s]:
in the fire test based on UL 94, vertical burning standard, the first afterburning time t1 was measured on rods having a thickness of 1.6 mm after a first flame application time of 10 seconds. After a waiting time of 2 seconds following the extinguishing of the flames and a second flame application time of 10 seconds following this waiting time, the second afterburning time t2 was measured.

Starting Materials

Components or experiments with the prefix "C-" are not according to the invention and serve for comparison.

Thermoplastic Polymer, Component A):

The following was used as component A):

a-I: a commercially available acrylonitrile/butadiene/styrene copolymer (ABS), Terluran® HI10 from BASF Aktiengesellschaft.

a-II: a styrene/acrylonitrile copolymer (SAN) comprising 34% by weight of acrylonitrile and 66% by weight of styrene, having a viscosity number of 79 ml/g.

Flameproofing Component B):

The following was used as component B1):

b1-I: exfoliated graphite Nord-Min® 503 from Nordmann, Rassmann, GmbH, comprising 8% by weight of intercalated sulfuric acid, having a median particle size $D_{50}$— before mixing of the melts in the screw extruder—of 465 μm, a free expansion (beginning at about 300° C.) of at least 150 ml/g and a bulk density of 0.5 g/ml at 20° C.

The following was used as component B2):

b2-I: Disflammol® TP, a triphenyl phosphate from Lanxess Aktiengesellschaft.

The following was used as component B3):

b3-I: polytetrafluoroethylene PTFE TE-3893, Teflon® dispersion from C. H. Erbslöh.

Screw Extruder SE:

SE-I:

A ZSK 30 twin-screw extruder from Werner and Pfleiderer, consisting of 11 barrel sections (the counting of the barrel sections begins at 0, the metering zone, and continues in the conveying direction up to 10, the discharge zone) and an associated pair of screws was used. The external diameter of the screws was 30 mm. All components except for component B1) were metered into barrel section 0, which was provided with a metering opening at the top. Barrel sections 2 and 3 comprise the melting zone, so that the material to be extruded is present in molten form on leaving barrel section 3. Component B1) was metered into barrel section 4. The screw was provided only with conveying elements in barrel sections 4 to 10.

SE-II:

Screw extruder identical to SE-I, but in barrel section 6 the screw was provided with a mixing element which scarcely displays any shearing action.

SE-C-I (for Comparison):

Screw extruder identical to SE-I, but in barrel section 6 the screw was provided with a plurality of mixing elements which in combination display a substantial shearing action.

Preparation of the Molding Materials and Moldings:

The components A) to B) and, if appropriate, C) (in each case parts by weight, cf. table 1) were homogenized in the screw extruders stated in table 1 and injection molded to give standard moldings in order to determine the mechanical properties and fire properties mentioned in table 1.

TABLE 1

Composition and properties of the molding materials (prefix C: for comparison, nd: not determined)

| Example | 1 | 2 | C-3 |
|---|---|---|---|
| Composition [parts by weight] | | | |
| Screw extruder | SE-I | SE-II | SE-C-I |
| a-I | 22.6 | 22.6 | 22.6 |
| a-II | 50.0 | 50.0 | 50.0 |
| b1-I | 12.0 | 12.0 | 12.0 |
| b2-I | 15.0 | 15.0 | 15.0 |
| b3-I* | 0.4 | 0.4 | 0.4 |
| Properties | | | |
| $D_a$ of component B1) [μm] | 107 | 97 | 86 |
| $D_n$ of component B1) [μm] | 25 | 24 | 24 |
| $D_a/D_n$ of component B1) | 4.3 | 4.0 | 3.6 |
| Notched impact strength $a_k$ at 23° C. [kJ/m$^2$] | 3.0 | 2.9 | 3.0 |
| Afterburning time** t1 [s] | 1.3 | 1.6 | 1.2 |
| Afterburning time** t2 [s] | 6.3 | 6.7 | >30 |

*calculated as solid
**mean value of 5 individual measurements

The examples show that the thermoplastic molding materials prepared by the processes according to the invention and comprising expandable graphite have an improved combination of flame-retardant and mechanical properties in comparison with known molding materials.

We claim:

1. A process for the preparation of thermoplastic molding materials comprising
A) from 39 to 99% by weight of at least one thermoplastic polymer,
B) from 1 to 60% by weight of a flameproofing component comprising
B1) an expandable graphite, and
C) from 0 to 60% by weight of further additives,
the percentages by weight being based in each case on the total weight of the components A) to C) and together giving 100% by weight,
by mixing melts of the components A), B) and, if present, C) in a screw extruder, the screw extruder comprising at least one metering zone, one plasticating zone, one homogenization zone and one discharge zone in this sequence along the conveying direction,
wherein the metering of the expandable graphite B1) into the screw extruder is effected at a point behind which—viewed in the conveying direction—the extruder screw comprises no shearing elements.

2. The process according to claim 1, wherein the metering of the expandable graphite B1) into the screw extruder is effected at a point behind which—viewed in the conveying direction—the extruder screw comprises only conveying screw elements.

3. The process according to claim 1, wherein the metering of the expandable graphite B1) into the screw extruder is effected between homogenization zone and discharge zone.

4. The process according to claim 1, wherein the flameproofing component B) comprises
B1) an expandable graphite,
B2) a flameproofing compound comprising phosphorus and
B3) a fluorine-containing polymer.

5. The process according to claim 4, wherein the flameproofing component B) comprises
from 20 to 79.99% by weight of the component B1),
from 20 to 79.99% by weight of the component B2) and
from 0.01 to 4% by weight of the component B3),
the percentages by weight being based in each case on the total weight of the components B1) to B3) and together giving 100% by weight.

6. The process according to claim 1, wherein component B2) is at least one compound selected from the group consisting of inorganic or organic phosphates, phosphites, phosphonates, phosphate esters, red phosphorus and triphenylphosphine oxide, and combination thereof.

7. The process according to claim 1, wherein component B3) is a fluorinated ethylene polymer.

8. A process for the preparation of thermoplastic molding materials comprising
A) from 39 to 99% by weight of at least one thermoplastic polymer;
B) from 1 to 60% by weight of a flameproofing component comprising
B1) from 20 to 79.99% by weight of an expandable graphite,
B2) from 20 to 79.99% by weight of a flameproofing compound comprising phosphorus which comprises at least one compound selected from the group consisting of inorganic or organic phosphates, phosphites, phosphonates, phosphate esters, red phosphorus and triphenylphosphine oxide, and
B3) 0.01 to 4% by weight of a fluorinated ethylene polymer; and
C) from 0 to 60% by weight of further additives,
the percentages by weight being based in each case on the total weight of the components A) to C) and together giving 100% by weight,
by mixing melts of the components A), B) and, if present, C) in a screw extruder, the screw extruder comprising at least one metering zone, one plasticating zone, one homogenization zone and one discharge zone in this sequence along the conveying direction,
wherein the metering of the expandable graphite B1) into the screw extruder is effected at a point behind which—viewed in the conveying direction—the extruder screw comprises no shearing elements.

* * * * *